United States Patent Office
3,089,993
Patented May 14, 1963

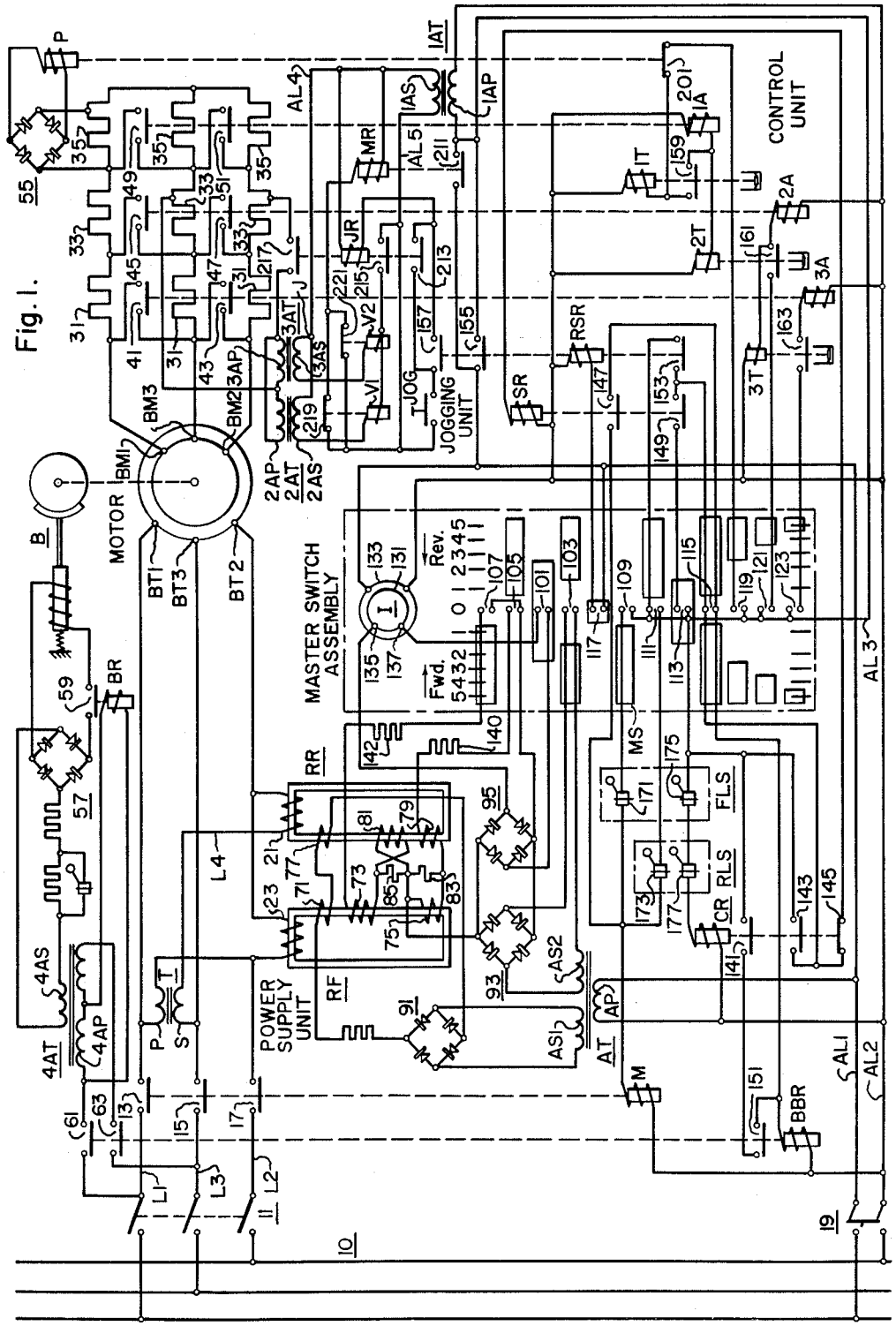

3,089,993
DRIVE APPARATUS
William R. Wickerham, Buffalo, N.Y., and Robert W. Egglestone, West Hartford, Conn., assignors to Westinghouse Electric Corporation, East Pittsburgh, Pa., a corporation of Pennsylvania
Filed Mar. 6, 1957, Ser. No. 644,380
15 Claims. (Cl. 318—443)

This invention relates to electric drives and has particular relationship to such drives for moving a load between selected positions. The load may be moved horizontally as a track or trolley drive of a crane or vertically as a hoist.

In certain applications of such drives it is necessary, for the purpose of adjusting the position of the load, to move the load in precisely predeterminable increments which are not readily perceptible either because they are small or because they are being viewed indirectly at reduced scale. A typical such application is in the nuclear industry where it may be desirable to move the enclosure of the reactor core, a shell weighing as high as 125 tons, under water. In adjusting the position of the enclosure it may be necessary to move the enclosure forward and reverse a few thousanths of an inch at a time. Such movement cannot readily be perceived by an operator. In adidtion the core enclosure may not be readily directly visible to the operator. In such situations the operator views a television image of the core and the enclosure. Since the image is considerably smaller than the actual enclosure, even substantial movements of the enclosure which would be perceptible directly are not perceptible on the screen.

It is accordingly broadly an object of this invention to provide such drive apparatus in the use of which it shall be feasible to jog or inch a load in small increments, the magnitude of which shall be precisely predeterminable by the operator.

Another object of this invention is to provide a method of and apparatus for inching or jogging a load in small precisely predeterminable increments.

A further object of this invention is to provide a novel relay circuit particularly suitable for use in the above-described apparatus for inching or jogging and in practicing the above-described method of inching or jogging.

Still another object of the invention is to provide a novel control for a drive which ends itself with particular facility to be used with the jogging or inching control in accordance with this invention.

The apparatus with which this invention concerns itself includes a three-phase drive motor, the torque-speed characteristic of which is set by unbalancing to the necessary extent the polyphase potential impressed on its stator field terminals. Specifically, the unbalancing may be effected by setting the saturation of reactors interconnected in a duplex interconnected three-phase system with the stator of the motor and the conductors of a three-phase power supply. The configuration of the stator field depends on the setting of the reactors. With the reactors set so that the three-phase potential impressed on the stator is balanced, a circularly rotating field is produced. With the reactors set so that the three-phase potential is partially unbalanced in one sense or the other, the rotating field is elliptical, the ellipse having an eccentricity depending on the unbalance. In the limit the field may become an oscillatory field such as is produced by a single-phase supply.

This invention arises from the realization that since during inching or jogging the rotor of the drive motor rotates slowly, a signal which can serve to measure the magnitude of a jogging increment can be derived from the rotor.

Whatever the configuration of the stator field, a corresponding field is induced in the rotor and alternating potential components produced by this field appear across the pairs of terminals of the rotor and change as the rotor rotates. Considering any pair of rotor terminals, the potential appearing between these terminals may be of constant magnitude but of cyclically changing phase as the rotor rotates when the stator field is circular, may cyclically vary both in phase and magnitude as the rotor rotates when the stator field is elliptical and may change in magnitude but not in phase when the limit is reached and the stator field is of the single-phase type. In the limit the rotor does not rotate but as the limit is approached the rotor rotates very slowly.

In accordance with this invention the cyclically varying alternating potential which appears at a pair of of the terminals of the rotor is converted into a potential which varies cyclically in magnitude so that as the rotor rotates from an angular position at which the potential between the terminals has one predetermined amplitude or phase position or amplitude and phase position to an angular position at which the potential between the terminals has another predetermined amplitude or phase position or amplitude and phase position the converted potential varies from a maximum to a minimum. This converted potential may be connected to control relays, discharge devices, transistors or magnetic logic elements so that the motor remains energized during at least a part of the interval during which the converted potential varies between the maximum and the minimum. During this part of the interval the rotor rotates over a precisely predeterminable angle depending on the setting of the reactors and moves the load over a corresponding precisely predeterminable increment.

In the practice of this invention it is desirable to control the apparatus with a master switch assembly of the general type disclosed in application Serial No. 627,486, filed December 10, 1956, to William R. Wickerham and assigned to Westinghouse Electric Corportion. This assembly includes an inductor and a master switch. The handle of the switch is coupled to the rotor of the inductor so that the output potential of the inductor depends on the position of the master switch. The rotor of the inductor is so oriented with reference to the handle that as the handle moves from one of the starting positions of the switch to an intermediate position, the output potential of the inductor increases from a low magnitude to its maximum magnitude.

While apparatus including this assembly has been found to operate highly satisfactorily, the apparatus has failed to respond in the manner desired to the setting of the master switch in the advanced positions, and it is an incidental object of this invention to provide drive apparatus including a master switch assembly of the type disclosed in the above mentioned Wickerham application which shall operate reliably and shall produce the speed-torque characteristic anticipated in the advanced settings of the master switch.

The aspect of this invention involving the master switch assembly arises from the discovery that the failure of the apparatus to respond as desired to the setting of the master switch in the advanced positions is caused by the condition that as the master switch is rotated to the advanced positions it carries with it the rotor and as the rotor is rotated beyond the position at which the inductor potential is a maximum, the inductor potential decreases, correspondingly decreasing the current flow through the control windings of the reactor under control. In accordance with this invention in its specific aspects then, drive apparatus is provided in which the excitation of the reactors produced by the inductor at the end of an early master switch stage is replaced in the advanced positions of the master switch by a constant excitation equal to the maximum excitation applied by the inductor. The failure of the drive apparatus to operate as desired in the advanced positions of the master switch is thus eliminated.

The novel features considered characteristic of this invention have been discussed generally above. The invention itself, both as to its organization and its method of operation, together with additional objects and advantages thereof, will be understood from the following description of a specific embodiment when read in connection with the accompanying drawings, in which:

FIGURE 1 is a circuit diagram showing the invention; and

Description

Figure 2A:
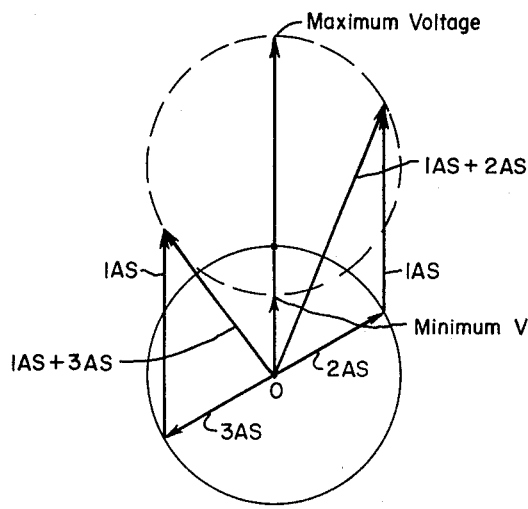
FIGS. 2A, 2B and 2C are graphs presenting important features of operation of the invention.

The apparatus shown in the drawings includes a motor, a power supply unit, a control unit, a jogging unit and a master switch assembly. This apparatus is supplied from a duplex-interconnected three-phase system including conductors L1, L2, L3 and L4. Conductors L1, L2 and L3 are adapted to be connected through disconnects 11 to a commercial three-phase power supply 10 which may be of the 440 volt 60 cycle type. Conductor L4 is adapted to be supplied from conductors L1 and L2 through the secondary S of an inverting transformer T when the contacts 13, 15, 17 of a contactor M is closed.

Power for control purposes may be derived from conductors AL1 and AL2 which are adapted to be connected to the supply 10 independently of the disconnects 11 which connect conductors L1, L2 and L3 to the supply. The potential between conductors AL1 and AL2 is in phase with the potential between L1 and L2. To the extent that voltages different than that available between conductors AL1 and AL2 may be necessary, such potentials may be derived from a transformer AT having a primary AP and secondaries AS1 and AS2.

The motor is of the three-phase induction wound-rotor type and includes a stator or primary having input terminals BT1, BT2, BT3 and a rotor having terminals BM1, BM2, BM3. Terminals BT1 and BT3 are adapted to be connected to conductors L1 and L3 through the contacts 13 and 15 of contactor M. Terminal BT2 is connected to conductor L4 through the output winding 21 of a reverse reactor RR in the power supply unit and also is adapted to be connected to conductor L2 through the output winding 23 of a forward reactor RF in the supply unit and the contact 17 of contactor M. The terminals BM1, BM2 and BM3 of the rotor are adapted to be interconnected through a plurality of resistors 31, 33, 35. These resistors are adapted to be short circuited progressively by the contacts 41, 43 and 45, 47 and 49, 51 of contactors 3A, 2A and 1A, respectively. The coil of relay P in the control unit is adapted to be energized from the potential impressed across a portion of one of the resistors 35 through a rectifier 55 when the motor is so loaded that the current conducted through the resistor 35 is above a predetermined magnitude.

The motor also includes a brake B of the magnetic type which is adapted to be energized from a rectifier 57 when a contact 59 of braking relay BR is closed. The rectifier 57 is supplied from the conductors L1 and L3 through contacts 61 and 63 of a relay BBR and the secondary 4AS of transformer 4AT. The coil of relay BR is connected to conductors L1 and L3 through contacts 61 and 63 in such manner that the relay BR may be energized when the contacts 13, 15, 17 of contactor M are open.

The power supply unit includes the forward reactor RF and the reverse reactor RR. The reactor RF includes, in addition to the output winding 23, a bias winding 71 and a pair of control windings 73 and 75. The reactor RR includes in addition to the output winding 21 a bias winding 77 and a pair of control windings 79 and 81. The windings 75 and 81 produce flux counteracting the bias flux in each reactor during operation of the apparatus and may be referred to as control or counter-bias windings. The control windings 75 and 81 of the reactors RF and RR, respectively, each has only a few turns (less than 73 and 79) and is shunted by a very low resistance (83 and 85) of the order of one half ohm. The bias windings are supplied from the secondary AS1 through a rectifier 91. The control windings 73 and 75 and 79 and 81 are adapted to be supplied from the secondary AS2 and the master switch assembly through rectifier 93 and also from the master switch assembly through rectifier 95 in a manner depending on the setting of the master switch assembly.

The master switch assembly is of the type disclosed in the above-identified Wickerham application and includes a master switch MS and an inductor I. The master switch has a plurality of contacts 101, 103, 105, 107, 109, 111, 113, 115, 117, 119, 121 and 123 which are maintained closed in certain positions of the switch and open in other positions of the switch. In the practice of this invention the contacts may be controlled from a plurality of properly oriented cams (not shown) rotatable by a handle (not shown). The closed positions of contacts 101 through 123 are represented diagrammatically by rectangles in FIG. 1.

The master switch has a plurality of forward positions labled 1, 2, 3, 4 and 5 and also a plurality of reverse positions similarly labeled. The inductor I has a rotor 131 and a stator 133. The rotor is connected to be rotated by handle (not shown) that rotates the cams. The stator is supplied from the conductors AL1 and AL2. The rotor has output terminals 135 and 137 which are connected to the A.-C. terminals of rectifier 95 through contact 101 of the switch in the off position and in forward and reverse positions 1 and 2, respectively. The direct current terminals of the rectifier 95 are adapted to be connected through contacts 105 and a resistor 140 to the control windings 75 and 79 of the reactors RF and RR, which may be called the reverse control windings A in all reverse positions of the master switch MS. The direct current terminals of rectifier 95 are also connected through contacts 107 and a resistor 142 to control windings 73 and 81, which may be called the forward control windings, in all forward positions of the switch MS. The forward and reverse control windings 173 and 81 and 75 and 79 of the reactors RF and RR are supplied with current from the rectifier 95 only in forward and reverse positions 1 and 2 since the connection between the rotor 131 and the rectifier 95 is broken in forward and reverse positions 3 through 5, respectively. The forward and reverse control windings of the reactors RF and RR are also adapted to be supplied from the secondary AS2 through another rectifier 93 and through contacts 103 of the master switch in the forward and reverse positions 2 through 5, respectively, of the master switch. The current supplied through the latter rectifier is substantially equal in magnitude to the maximum current supplied through the inductor. As disclosed in the Wickerham application, the switch is movable over a continuum of points between forward and reverse positions 1 and 2, respectively, and as it is so moved is capable of varying the output of the inductor over a continuum of magnitudes from a lower magnitude to a higher magnitude.

The control unit includes in addition to the relay BBR and the relay P relays CR, SR, RSR and time delay relays 1T, 2T and 3T. The relay CR has a pair of normally open contacts 141 and 143 and a normally closed contact 145. Relay SR has a pair of normally open contacts 147 and 149. Relay BBR has, in addition to the contacts 61 and 63 through which the relay BR is supplied, a normally open contact 151. Relay RSR has three normally open contacts 153, 155, 157. Relays 1T, 2T, and 3T are of the type which when energized become actuated after a predetermined interval but when deenergized drop out instantaneously. These relays each have a normally open contact 159, 161, 163.

The coil of contactor M is adapted to be connected between a normally deenergized auxiliary conductor AL3 and conductor AL2 through a normally closed contact 171 of a limit switch FLS and contacts 109 of the master switch which is closed in all five forward positions. The coil of contactor M is also adapted to be connected between conductors AL2 and AL3 through a normally closed contact 173 of a limit switch RLS and contacts 111 of the master switch MS which are closed in all five reverse positions. The limit switches RLS and FLS are actuated when the load reaches a control region. In this region it is essential that the load move very slowly and the apparatus disclosed herein includes provisions for so moving the load with the limit switches RLS or FLS actuated. For this purpose the coil of contactor M is also adapted to be connected between conductors AL2 and AL3 through normally open contact 147 of relay SR and through the following circuits, (1) contacts 115, in all forward and reverse positions of the switch MS, contact 149 of SR and contacts 113 in the off position and forward and reverse positions 1, (2) contacts 151 of BBR, 141 of CR, (3) contacts 115 in all forward and reverse positions of the switch, and 143 of CR, (4) contacts 115 and 153 of RSR.

The coil of relay CR is connected between conductors AL2 and AL3 through additional normally closed contacts 175 and 177 of the forward and reverse limit switches FLS and RLS. The coil of relay BBR is adapted to be connected between the conductors AL2 and AL3 through the following branch networks: (1) normally open contact 147 of relay SR, the contact 171 of the forward limit switch and the master switch MS in all five forward positions; (2) the contact 147 of SR and the contact 173 of the reverse limit switch and the master switch in all five reverse positions; (3) the normally open contacts 151 and 141 of relays BBR and CR; (4) the master switch MR in all forward and reverse positions and normally open contact 153 of relay RSR; (5) the master switch in all forward and reverse positions and the normally open contact 143 of relay CR; (6) the master switch in the off position in forward and reverse positions 1 and a normally open contact 149 of relay SR.

The coil of relay SR is adapted to be connected between conductors AL2 and AL3 in the following circuits: (1) normally closed contact 145 of relay CR and normally open contact 153 of relay RSR; (2) normally closed contact 145 of relay CR, the normally open contact 149 of relay SR, and the master switch MS in the off position and forward and reverse positions 1; (3) normally closed contact 145 of relay CR, the master switch in all forward and reverse positions, normally open contact 147 of relay SR, contact 171 of the forward limit switch FLS and the master switch MS in all forward positions; (4) normally closed contact 145 of relay CR, the master switch in all forward and reverse positions, normally open contact 147 of relay SR, contact 173 of the reverse limit switch RLS and the master switch in all reverse positions.

The coil of relay RSR is connected between conductors AL1 and AL2 through a contact 117 of the master switch MS which is closed in the off position. The coil of relay 1T is adapted to be connected between conductors AL2 and AL3 through the normally closed contact 201 of relay P and the master switch MS in forward and reverse positions 3, 4 and 5. The coil of the contactor 1A is adapted to be connected between conductors AL2 and AL3 through the normally open contact 159 of relay 1T, the normally closed contact 201 of relay P and the master switch in forward and reverse positions 3, 4, 5. Relay 2T is similarly adapted to be connected between conductors AL2 and AL3. The coil of contactor 2A is adapted to be connected between conductors AL2 and AL3 through the normally open contact 161 of relay 2T and through the master switch in forward and reverse positions 4 and 5. The coil of relay 3T is similarly adapted to be connected between conductors AL2 and AL3. The coil of contactor 3A is adapted to be connected between conductors AL2 and AL3 through the contact 163 of relay 3T and the master switch in forward and reverse positions 5.

The jogging unit includes a transformer 1AT, the primary 1AP of which is connected between conductors AL2 and AL3 and the secondary 1AS to conductors AL4 and AL5. The jogging unit also includes a jogging pushbutton JOG and relays MR, JR, V1 and V2. Relay MR has a normally open contact 211. Relay JR has three normally open contacts 213, 215, 217. Relays V1 and V2 are each of the type which becomes actuated when the current through its coil exceeds a predetermined magnitude and once actuated remains actuated so long as the current flowing through its coil exceeds a magnitude which is substantially lower than the actuation magnitude. It has been found that Potter-Brumfield MS2A relays may be used for relays V1 and V2. Relays V1 and V2 each have a normally closed contact 219 and 221 respectively. The normally open contact 211 of relay MR and normally open contact 155 of relay RSR are connected between conductors AL1 and AL3 so that when either of these relays is actuated, conductor AL3 is energized. With conductor AL3 energized, transformer 1AT would be energized and conductors AL4 and AL5 would be energized.

The coil of relay MR is connected between conductors AL4 and AL5 through the normally closed contacts 219 and 221 of relays V1 and V2 so that both relays must be actuated to disconnect the coil of MR from conductors AL4 and AL5. The coil of relay JR is adapted to be connected between conductors AL4 and AL5 through the jogging pushbutton JOG and alternatively through the normally open contacts 213 or 157 of relays JR and RSR. The coils of relays V1 and V2 are supplied from a pair of transformers 2AT and 3AT. The primaries 2AP and 3AP are supplied in opposite phase through a normally open contact 217 of relay JR from the secondary terminals BM3 and BM2 through the resistors 31 and 33 connected to these secondary terminals. The coil of relay V1 is adapted to be connected in a series network including the secondary 1AS, the secondary 2AS and the normally open contact 215 of relay JR; the coil of relay V2 is adapted to be connected in a series network including the secondary 1AS, the secondary 3AS and the contact 215 of relay JR.

The potential of 1AS, 2AS, and 3AS may vary over a wide range. In a typical case, the output of 1AS is about 65 volts R.M.S. and the secondaries 2AS and 3AS have outputs of about 40 volts R.M.S.

*Standby*

In the standby condition of the apparatus, the disconnects 11 and 19 are closed so that the conductors AL1 and AL2 are energized. The master switch MS is in the off position so that the contactor M and the motor are deenergized. The output windings 23 and 21 of the reactors RF and RR are also deenergized.

With the master switch MS in the off position the inductor I is energized, but the direct current terminals of the rectifier 95 through which it supplies current to the control windings 75 and 79 and 81 and 73 of the reactors are disconnected from the control windings. Similarly, the rectifier 93 supplied from the secondary AS2 is also disconnected from the control windings 75, 79 and 81, 73 of the reactors. The biasing windings 71 and 77 of the reactor are energized through the rectifier 91 connected to the secondary 1AS.

Relay RSR is energized and its normally open contacts 153 and 155 are closed. Conductors AL2 and AL3 are then capable of supplying power. It may initially be assumed that the load is not in the critical region and the limit switches FLS and RLS are then unactuated. Relay CR is then actuated and at its now open contact 145 prevents actuation of SR. Contactor M and relay BBR are adapted to be energized through the master switch MS. Relays 1T, 2T, 3T and contactors 1A, 2A, 3A are deenergized so that the maximum resistance 31 through 35 is connected in circuit with the rotor of the motor. Relay P is also deenergized because the motor is deenergized.

Since relay RSR is actuated, conductors AL4 and AL5 are energized. Relay MR is then energized and conductors AL3, AL4 and AL5 are locked in through the now closed contact 211 of relay MR. Relay JR is deenergized but is adapted to be energized through the jog button JOG. Relays V1 and V2 are deenergized as are also transformers 2AT and 3AT.

Operation

Preparatory to an operation the apparatus is loaded. The load may be moved underwater so that the charging must be controlled by viewing a kinescope screen. The apparatus may be regarded as initially at the extreme reverse position out of the critical range.

The supporting parts of the apparatus must first be loaded and for this purpose the jogging unit is operated. The jogging depends on the operation of relays V1 and V2 which are supplied from the secondaries 1AS and 2AS and 1AS and 3AS, respectively. For an understanding of the manner in which the relays V1 and V2 are controlled, it is desirable to refer to FIGS. 2A, 2B and 2C. The figures present the relationship between the potentials impressed on the coils of V1 and V2, as the rotor of the motor rotates slowly, from the secondaries 1AS, 2AS, 3AS assuming relay JR to have been actuated and contacts 215 and 217 to be closed.

Figure 2B:
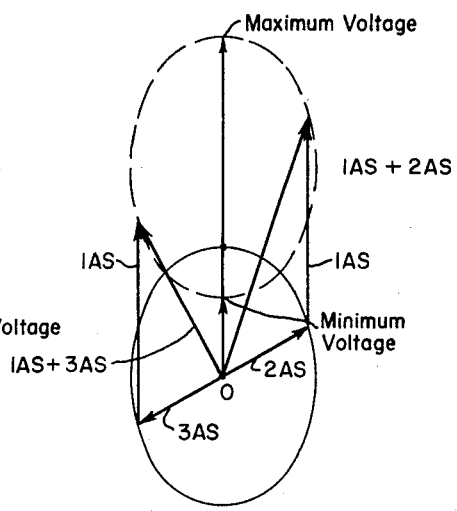
Figure 2C:
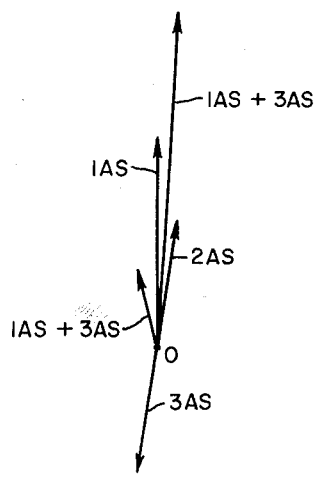

FIGS. 2A, 2B and 2C are vector diagrams showing the potential impressed on the relays V1 and V2 for different positions of the rotor of the motor and for different settings of the reactors FR and RR. In each of the figures the junction J of secondary 1AS and secondaries 2AS and 3AS, respectively, is assumed to be the center O and vectors corresponding to the potentials which appear across the secondaries 2AS and 3AS are plotted from the point O and are labelled correspondingly. Vectors 2AS and 3AS are of opposite phase. Vectors 2AS and 3AS vary in accordance with the settings of reactors FR and RR as the rotor of the motor is rotated and diagrams for three different types of settings are plotted in FIGS. 2A, 2B and 2C.

FIG. 2A corresponds to a situation in which the reactors are so set that the potential supplied to the motor is balanced. In this case for different positions of the rotor the potentials across the secondaries 2AS and 3AS vary in phase but not in amplitude. In this case the locus of the terminal points of the vectors is a circle. If the supply is unbalanced, the vectors 2AS and 3AS vary both in phase and magnitude, and in this case the locus of the terminal points of the vectors is an ellipse as shown in FIG. 2B. In the limit the ellipse degenerates into a straight line as shown in FIG. 2C. The potential across the relays V1 and V2, respectively, is equal to the sum of the potentials of 1AS and 2AS and 1AS and 3AS. The vector 1AS may be plotted vertically as shown. The sums of 1AS+2AS and 1AS+3AS is presented vectorially in FIGS. 2A, 2B, 2C for random positions of the rotor and in FIGS. 2A and 2B also for the position at which the sums are a maximum and a minimum, respectively. It is seen that as the rotor rotates, the potentials impressed on the coils of relays V1 and V2 respectively vary continuously, first decreasing through the minimum amplitude and the increasing through the maximum amplitude in one case and first increasing through the maximum amplitude and then decreasing through the minimum amplitude in the other case. Thus, in the situation represented in FIG. 2A, it may be assumed that the rotor rotates so that the vectors 2AS and 3AS vary in the direction of the arrow along the locus circle and that the rotation starts at the point at which vectors 2AS and 3AS are plotted. In this case the vector 1AS+2AS; that is, the voltage across the coil of V1, would increase until it reaches the maximum and then decrease, and the vector 1AS+3AS; that is, the voltage across the coil of V2, would decrease until it reaches the minimum and then increase.

The potentials of 1AS, 2AS and 3AS and the relays V1 and V2 are so related that to actuate a relay V1 or V2 the potential across its core must be in the neighborhood of the maximum, and that once actuated the relay remains actuated as the potential decreases to the minimum. For the actual potentials specified, the relays V1 and V2 should be actuated when the potential reaches about 101 volts R.M.S. and remain actuated as the potential drops to 25 volts R.M.S., under such circumstances in the case represented by FIG. 2A, relay V1 would be actuated when vector 1AS+2AS reaches the position of the maximum-voltage vector (vertical in drawing) and after this V2 would be actuated when 1AS+3AS reaches the position of the maximum-voltage vector. At this instant 1AS+2AS is at a minimum, but V1 is still actuated. Thus, when V2 is actuated, both V1 and V2 are actuated and contacts 219 and 221 are open.

With the above explanation in mind, the operation of the jogging system may be understood. For jogging, the master switch MS is initially set in the off position so that relay RSR is actuated and the jogging button JOG is closed. The jogging relay JR is then actuated and locked in through its normally-open now-closed contact 213. The coils V1 and V2 are now connected in the circuits with the secondaries 1AS and 2AS and 1AS and 3AS through contact 215 and potential can be supplied to the primaries 2AP and 3AP through contact 217 when the motor is energized. The master switch MS is now moved to forward or reverse positions 1 depending on the direction of rotation desired. This movement deenergized relay RSR opening its contacts 155 and 157 and JR remains actuated through its contact 213 and MR through its contact 211 and contacts 219 and 221 of relays V1 and V2. The movement of switch MS also actuates contactor M and relay BBR (through contacts 115 and 143) and energizes the motor in a manner dependent on the setting of the reactors FR and RR and releases the brake B causing the rotor to rotate and the load in this case the supporting platform to move. The sum of the vectors 1AS plus 3AS and 1AS plus 2AS then sweep segments from their initial position. First one of the relays V1 or V2 is actuated and then after the rotor has swept through a further segment, the other of the relays is actuated. The actuation of one of the relays opens contact 219 or 221 but the coil of relay MR remains actuated through the other contact until it opens. When relay MR is deenergized, its contact 211 opens deenergizing AL3 so that contactor M is deenergized, the motor stops and relays V1, V2 and JR are deenergized. The rotor has now rotated less than a complete revolution and stopped at a position in which vectors 1AS+2AS and 1AS+3AS are about colinear with the maximum and minimum potential vectors. Now the master switch MS must be reset to off and the JOG button opened and reclosed for another jog of the rotor. This time the rotor rotates from the last position just described to a position in which the vectors 1AS+2AS and 1AS+3AS are again aligned with the maximum and minimum vectors. The rotation is of the order of one-half revolution. Thus, rotation moves the load a known distance. The last-described operation may now be repeated to move the load known distances in one direction or the other until the load has the desired position.

Now the load may be moved into the control region at any speed desired. For this purpose the master switch is first moved to forward position 1. Contactor M and relay BBR are then actuated and current is supplied through the forward control windings 75 and 81 of the reactors RF and RR. The current through the winding 81 counterbalances the bias current through winding 27 and raises the reactance of RR to a maximum. The current through the winding 81 is cumulative with the bias current through 71 reducing the reactance of RF. The motor is rotated in a direction to produce the forward movement.

The handle of the master switch MS is now moved from forward position 1 to forward position 2 in a manner such as to increase the speed of the motor at the desired rate. The manner in which the motor speed is increased is explained in the above-described Wickerham application. As the handle is moved from position 1 to position 2, the current flow through the forward windings of the reactors RR is gradually increased, increasing the power supply to the motor until the motor attains the intermediate speed corresponding to forward position 2 of the master switch.

At forward position 2 the rectifier connected to the secondary AS2 is connected to the forward control windings 75 and 79 of the reactors RF and RR and for the time being the reactors are supplied with current equal to the sum of the currents derivable from the inductor I and the secondary AS2. To attain a higher speed the master switch is moved to forward position 3. This disconnects the inductor I from the forward control windings 73 and 81 and connects only the secondary AS2. This secondary supplies current approximately equal to that supplied by the inductor I. The movement of the handle of the master switch MS and the corresponding movement of the rotor of the inductor I then to positions at which the inductor potential is decreased does not affect the forward and reverse reactors RF and RR.

In forward position 3 timing relay 1T is energized if the loading is such that the current flow through the coil of relay P is inadequate to actuate relay P. After relay 1T has been energized for a predetermined time interval, it is actuated, energizing contactor 1A and reducing the resistance in the rotor circuit of the motor. The switch may now be moved to forward positions 4 and 5 to reduce further the resistance in the rotor circuit of the motor by actuating contactors 2A and 3A.

It may now be assumed that the load is in the critical region so that the forward limit switch FLS is actuated and its contacts 171 and 175 are opened. Contactor M is now deenergized and the motor stops. In addition, relay CR is deenergized and contact 145 recloses and contact 141 reopens. BBR is then deenergized, and the brake is now applied to the motor. The motor may now be moved at a low speed.

For this purpose, the master switch MS is returned to the off position actuating RSR and closing its contact 153. Relay SR is then actuated locking itself in the off position and forward and reverse positions 1 through its contact 149 and contact 113. Braking relay BBR may now be actuated in forward position 1 through contacts 115, 149 and 113. Contactor M may be actuated in forward position through contacts 147, 115, 149, 113. Thus, the motor may move the load forward only in forward position 1 and therefore very slowly. When the master switch MS is moved to a higher forward position than 1, relay SR is deenergized and the circuit of contactor M cannot be closed. With the forward limit switch FLS open the motor may be driven in all reverse positions of the switch MS.

The reverse movement is similar to the forward movement. In this case the master switch MS is moved to reverse positions and the control is through reverse control windings 75 and 79.

After this the load is moved in a forward direction until the reverse limit switch is closed. Relay CR is then actuated, opening its contact in series with the coil of relay SR and deenergizing the latter. With relay SR deenergized, the coil of relay BBR is adapted to be connected to conductors AL2 and AL3 only through the master switch in all forward and reverse positions and the closed contact of relay RSR.

*Conclusion*

The apparatus disclosed herein is a drive which may be a hoist or drive apparatus for moving a load horizontally and with which highly precise jogging or inching may be carried out. While a preferred embodiment of this invention has been disclosed herein, many modifications thereof are feasible. The invention, therefore, is not to be restricted except insofar as is necessitated by the spirit of the prior art.

We claim as our invention:

1. Apparatus for jogging a drive including a driving motor having a rotor having output terminals between which a rotor alternating potential variable in phase or amplitude or both phase and amplitude in dependence on the function of said rotor is derivable, an energizing circuit for said motor open in the standby condition of said drive, and manually actuable switch means for closing said circuit, the said apparatus comprising in combination first conductors to be connected to said output terminals to derive a first control alternating potential from said rotor potential, second conductors to be connected to said output terminals to derive a second control alternating potential from said rotor potential, said second potential being of substantially different phase than said first potential, third conductors for supplying a third control alternating potential of substantially constant amplitude, normally open switch means connected to said manual switch means to be closed on the closing of said manual means, a first relay having an actuating coil, a second relay having an actuating coil, each of said relays becoming actuated when an alternating potential of at least a first predetermined amplitude is impressed on the actuating coil thereof and remaining actuated so long as the potential impressed across the coil thereof has an amplitude greater than a second predetermined amplitude which is substantially less than said first amplitude, means connecting in series said first conductors, said third conductors, said coil of said first relay and said normally open switch means, means connecting in series said second conductors, said third conductors, said coil of said second relay and said normally open switch means, and means connected to said first and second relays and said energizing circuit for controlling the opening and closing of said circuit when said manual switch means is closed.

2. Apparatus for jogging a drive including a driving motor having a rotor having output terminals between which a rotor alternating potential variable in phase or amplitude or both phase and amplitude in dependence on the function of said rotor is derivable, an energizing circuit for said motor open in the standby condition of said drive, and manually actuable switch means for closing said circuit, the said apparatus comprising in combination first conductors to be connected to said output terminals to derive a first control alternating potential from said rotor potential, second conductors to be connected to said output terminals to derive a second control alternating potential from said rotor potential, said second potential being of substantially different phase than said first potential, third conductors for supplying a third control alternating potential of substantially constant amplitude, normally open switch means connected to said manual switch means to be closed on the closing of said manual means, a first relay having an actuating coil, a second relay having an actuating coil, each of said relays becoming actuated when an alternating potential of at least a first predetermined amplitude is impressed on the actuating coil thereof and remaining actuated so long as the potential impressed on the coil thereof has an amplitude greater than a second predetermined amplitude which is substantially less than said first amplitude, means connecting in series said first conductors, said third conductors, said coil of said first relay and said normally open switch means, means connecting in series said second conductors, said third conductors, said coil of said second relay and said normally open switch means, and means connected to said first and second relays and said energizing circuit for controlling the opening and closing of said circuit when said manual switch means is closed, said first predetermined amplitude being of the order of the maximum amplitude of the vector sum of said first and third potentials and also of the maximum amplitude of the vector sum of said second and third potentials and said second predetermined amplitude being of the order of the minimum amplitude of the vector sum of said first and third potentials and also of the minimum amplitude of the vector sum of said second and third potentials.

3. Apparatus for jogging a drive including a motor having a rotor having output terminals between which a rotor potential appears when said motor is energized, an energizing circuit for said motor open in the standby condition of said drive, and manually actuable switch means for closing said circuit, said apparatus including in combination means connected to said terminals for deriving a control potential from said terminals having a magnitude dependent on the position of said rotor, control switch means connected to said circuit for opening and closing said circuit when said manually actuable switch means is maintained actuated, voltage responsive means connected to said switch means to actuate said switch means, said voltage responsive means being actuable when a voltage exceeding a first predetermined magnitude is impressed thereon and once actuated remaining actuated so long as a voltage of a magnitude less than said first magnitude but greater than a predetermined second magnitude is impressed thereon, and means connected to said deriving means and to said voltage responsive means for impressing said control potential on said impressing means, said first predetermined magnitude being of the order of the maximum magnitude of said control potential and said second predetermined magnitude being of the order of the minimum magnitude of said control potential and said control switch means closing said circuit with said manually actuable means closed when said voltage responsive means is unactuated and opening said circuit when said voltage responsive means is actuated.

4. Driving apparatus comprising in combination a motor having a rotor having output terminals from which an alternating potential is derivable when said motor is energized, an energizing circuit for said motor, said circuit including means for varying the energization of said motor, said varying means being capable of being set over a range of settings from a setting in which said alternating potential varies in phase only and not in magnitude as said rotor rotates through settings in which said potential varies to different degrees both in phase and magnitude as said rotor rotates to a setting in which said potential varies only in magnitude and not in phase as said rotor rotates, said energizing circuit being open in the standby condition of said apparatus, manually actuable switch means open in the standby condition of said apparatus and when closed closing said circuit, normally closed switch means connected to said circuit, said normally closed switch means when open opening said circuit when said manually actuable means is closed, voltage responsive means for actuating said normally closed switch means to open, and means connecting said terminals to said voltage responsive means to impress thereon a voltage variable in magnitude in accordance with the angular position of said rotor, said voltage as said rotor rotates varying cyclically over a predetermined range of magnitudes in any setting of said energizing circuit from a maximum magnitude for said last named setting to a minimum magnitude for said last named setting, said voltage responsive means being actuable when a voltage of magnitude less than said maximum magnitude at the last named setting at which said maximum magnitude is the lowest but substantially greater than the minimum magnitude at the last named setting at which said minimum magniude is the highest is impressed thereon and once actuated remaining actuated so long as the voltage impressed thereon has a magnitude of the order of said minimum magnitude at the last named setting at which said minimum magnitude is the lowest.

5. Driving apparatus comprising in combination a motor having a rotor having output terminals from which an alternating potential is derivable when said motor is energized, an energizing circuit for said motor, said circuit including means for varying the energization of said motor, said varying means being capable of being set over a range of settings from a setting in which said alternating potential varies in phase only and not in magnitude as said rotor rotates through settings in which said potential varies to different degrees both in phase and magnitude as said rotor rotates to a setting in which said potential varies only in magnitude and not in phase as said rotor rotates, said energizing circuit being open in the standby condition of said apparatus, manually actuable switch means open in the standby condition of said apparatus and when closed closing said circuit, normally closed switch means connected to said circuit, said normally closed switch means when open opening said circuit when said manually actuable means is closed, voltage responsive means for actuating said normally closed switch means to open, and means connecting said terminals to said voltage responsive means to impress thereon a voltage variable in magnitude in accordance with the angular position of said rotor, said voltage as said rotor rotates varying cyclically over a predetermined range of magnitudes in any setting of said energizing circuit from a maximum magnitude for said last named setting to a minimum magnitude for said last named setting, said voltage responsive means being actuable when a voltage of magnitude less than said maximum magnitude at the last named setting at which said maximum magnitude is the lowest but substantially greater than the minimum magnitude of said last named setting at which the minimum magnitude is the highest is impressed thereon and once actuated remaining actuated so long as the voltage impressed thereon has a magnitude higher than said minimum magnitude at the last named setting at which said minimum magnitude is the lowest, said impressing means including means connected to said output terminals for deriving from said alternating potential a second alternating potential in phase with said potential derivable from said output terminals and a third alternating potential in opposite phase to said second potential, said impressing means also including means for producing a fourth alternating potential of constant phase and amplitude, and means connected to said voltage responsive means for impressing thereon potentials equal to the vector sums of said second and fourth potentials and said third and fourth potentials.

6. Driving apparatus comprising in combination a motor having a rotor having output terminals from which an alternating potential is derivable when said motor is energized, an energizing circuit for said motor, said circuit including means for varying the energization of said motor, said varying means being capable of being set over a range of settings from a setting in which said alternating potential varies in phase only and not in magnitude as said rotor rotates through settings in which said potential varies to different degrees both in phase and magnitude as said rotor rotates to a setting in which said potential varies only in magnitude and not in phase as said rotor rotates, said energizing circuit being open in the standby condition of said apparatus, manually actuable switch means open in the standby condition of said apparatus and when closed closing said circuit, a first relay means having first normally closed contact means, second relay means having second normally closed contact means, means connecting said first and second contact means in said circuit so that when both said contact means are open said circuit is open even while said manually actuable means is closed, and means connecting said terminals to said relay means to impress thereon a voltage variable in magnitude in accordance with the angular position of said rotor, said voltage as said rotor rotates varying cyclically over a predetermined range of magnitudes in any setting of said energizing circuit from a maximum magnitude for said last named setting to a minimum magnitude for said last named setting, each of said relay means being actuable when a voltage of magnitude less than said maximum magnitude at the last named setting at which said maximum magnitude is the lowest but substantially higher than said minimum magnitude at said last named setting at which said minimum magnitude is the highest is impressed thereon and once actuated remaining actuated so long as the voltage impressed thereon has a magnitude higher than said minimum magnitude at the last named setting at which said minimum magnitude is the lowest.

7. Driving apparatus comprising in combination a motor having a rotor having output terminals from which an alternating potential is derivable when said motor is energized, an energizing circuit for said motor, said circuit including means for varying the energization of said motor, said varying means being capable of being set over a range of settings from a setting in which said alternating potential varies in phase only and not in magnitude as said rotor rotates through settings in which said potential varies to different degrees both in phase and magnitude as said rotor rotates to a setting in which said potential varies only in magnitude and not in phase as said rotor rotates, said energizing circuit being open in the standby condition of said apparatus, manually actuable switch means open in the standby condition of said apparatus and when closed closing said circuit, a first relay means having first normally closed contact means, a second relay means having second normally closed contact means, means connecting said first and second contact means in said circuit so that when both said contact means are open said circuit is open even while said manually actuable means is closed, and means connecting said terminals to said relay means to impress thereon a voltage variable in magnitude in accordance with the angular position of said rotor, said voltage as said rotor rotates varying cyclically over a predetermined range of magnitudes in any setting of said energizing circuit from a maximum magnitude for said last named setting to a minimum magnitude for said last named setting, each of said relay means being actuable when a voltage of magnitude less than said maximum magnitude at the last named setting at which said maximum magnitude is the lowest but substantially greater than said minimum magnitude at said last named setting at which said minimum magnitude is the highest is impressed thereon and once actuated remaining actuated so long as the voltage impressed thereon has a magnitude higher than said minimum magnitude at the last named setting at which said minimum magnitude is the lowest, and impressing means including means connected to said output terminals for deriving from said alternating potential a second alternating potential in phase with said alternating potential derivable from said terminals and a third alternating potential of opposite phase to said second potential, said impressing means also including additional terminals for producing a fourth alternating potential of constant phase and amplitude, means connected to said first relay means for impressing thereon in series said second and fourth potentials, and means connected to said second relay means for impressing thereon in series said third and fourth potentials.

8. In combination, first relay means, second relay means, each said relay means being actuable when a potential having a magnitude exceeding a first predetermined magnitude is impressed thereon and once actuated remaining actuated so long as the potential thereon is higher than a second predetermined magnitude which is substantially less than said first magnitude, first terminals for impressing a first alternating potential cyclically variable in amplitude or phase or in both amplitude and phase, second terminals for impressing a second alternating potential in opposite phase to said first potential, third terminals for impressing a third alternating potential of constant phase and amplitude, means connecting in series said first relay means, said first terminals and said third terminals, and means for connecting in series said second relay means, said second terminals and said third terminals.

9. In combination, reactor means having control winding means, a master switch assembly including a master switch and an inductor, said master switch having at least an off position, an intermediate position and an advanced position and having manual means for setting said switch in said positions, said manual means normally setting said switch in said off position and being capable of setting said switch in a continuum of settings between said off and said intermediate positions, said inductor having a rotor and output terminals, a potential dependent on the angular position of said rotor appearing between said output terminals when said inductor is energized, said assembly also including means connecting said manual means to said rotor so that said rotor rotates from a position at which said potential is a minimum to a position at which said potential is a maximum as said manual means is set over said continuum from said off position to said intermediate position, means connecting said terminals to said control winding means, and means connected to said control winding means and to said master switch and operative when said switch is in said advanced position to impress a potential on said control winding means which is substantially equal to said maximum.

10. In combination, reactor means having control winding means, a master switch assembly including a master switch and an inductor, said master switch having at least an off position, an intermediate position and an advanced position and having manual means for setting said switch in said positions, said manual means normally setting said switch in said off position and being capable of setting said switch in a continuum of settings between said off and said intermediate positions, said inductor having a rotor and output terminals, a potential dependent on the angular position of said rotor appearing between said output terminals when said inductor is energized, said assembly also including means connecting said manual means to said rotor so that said rotor rotates from a position at which said potential is a minimum to a position at which said potential is a maximum as said manual means is set over said continuum from said off position to said intermediate position, means connecting said terminals to said control winding means, and means connected to said control winding means and to said master switch and operative when said switch is in said advanced position to impress a potential on said control winding means which is substantially equal to said maximum, and means connected to said control winding means and to said master switch and operative also when said switch is in said advanced position to disconnect said output terminals from said control winding means.

11. In combination with conductors of a three-phase supply, a first reactor and a second reactor, each said reactor having output winding means, control winding means, bias-winding means and counter-bias winding means, means connecting said output winding means of said reactors to said supply to set the balance of said supply in dependence upon the reactance of said reactors, means connected to said bias-winding means for supplying biasing current thereto, first control potential supply conductors, second control potential supply conductors, means connecting in series said first supply conductors, said control winding means of said first reactor and said counter-bias winding means of said second reactor, and means connecting in series said second supply conductors, said control winding means of said second reactor and said counter-bias winding means of said first reactor, said control winding means of each reactor being wound so that the current therethrough from the connected control-potential supply conductors produces flux cumulative with the flux produced by the current through the bias-winding means of said last named reactor, and counter-bias winding means of each reactor being so wound that the current therethrough from the connected control-potential supply conductors produces flux substantially counteracting the flux produced by the current through the bias-winding means of said last named reactor.

12. Apparatus for controlling the supply of power from a source to a load comprising in combination a first reactor and a second reactor, each said reactor having output winding means, control winding means, bias-winding means and counter-bias winding means, means connecting said output winding means of said reactors between said source and said load to control said supply of power in dependence upon the reactance of said reactors, means connected to said bias-winding means for supplying biasing current thereto, first control potential supply conductors, second control-potential supply conductors, means connecting in series said first supply conductors, said control winding means of said first reactor and said counter-bias winding means of said second reactor, and means connecting in series said second supply conductors, said control winding means of said second reactor and said counter-bias winding means of said first reactor, said control winding means of each reactor being wound so that the current therethrough from the connected control potential supply conductors produces flux cumulative with the flux produced by the current through the bias winding means of said last named reactor and said counter-bias winding means of each reactor being so wound that the current therethrough from the connected control potential supply conductors produces flux substantially counteracting the flux produced by the current through the bias winding means of said last named reactor.

13. Control apparatus for timing the supply of power from a main power supply to a load including a first relay having a coil and a back contact, a second relay having a coil and a back contact, means connecting said load to said supply through both said contacts in parallel so that said load is energized so long as either of said contacts remains closed, a first auxiliary supply capable of producing a cyclically varying first potential which periodically varies between a predetermined higher magnitude and a predetermined lower magnitude, a second auxiliary supply capable of producing a cyclically varying second potential periodically between a predetermined higher magnitude and a predetermined lower magnitude, said second potential varying similarly to but in different phase than said first potential, periodically between a predetermined higher magnitude and a predetermined lower magnitude, means connected to said first supply for impressing said first potential on the coil of said first relay, and means connected to said second supply for impressing said second potential on the coil of said second relay, said first and second relays operating sequentially when the voltage of each relay in its turn reaches said higher magnitude.

14. Control apparatus for timing the supply of power from a main power supply including a first relay having a coil and at least one contact, a second relay having a coil and at least one contact, means connecting said load to said supply through both said contacts in parallel so that a decrease in the transmission of current from said supply through said load takes place only on operation of both said contacts, a first auxiliary supply capable of producing a cyclically varying first potential which periodically varies between a predetermined higher magnitude and a predetermined lower magnitude, a second auxiliary supply capable of producing a cyclically varying second potential, said second potential varying similarly to but in different phase than said first potential periodically between a predetermined higher magnitude and a predetermined lower magnitude, means connected to said first supply for impressing said first potential on the coil of said first relay, and means connected to said second supply for impressing said second potential on the coil of said second relay, said first and second relays operating sequentially when the voltage of each relay in its turn reaches said higher magnitude.

15. Apparatus for jogging a drive including a driving motor having a rotor having output terminals between which a potential variable in dependence on the position of said rotor is derivable, an energizing circuit connected to said motor, said circuit being open in the standby condition of said apparatus, manually actuable switch means connected to said circuit for closing said circuit, said circuit when said manually switch means is closed energizing said motor to cause rotation of said rotor and the producing of said variable potential between said terminals, and means connected to said terminals and responsive to said variable potential for opening said energizing circuit while said switch means remains closed when said variable potential has varied through a predetermined range.

References Cited in the file of this patent
UNITED STATES PATENTS

| | | |
|---|---|---|
| 2,460,276 | Bernas | Feb. 1, 1949 |
| 2,534,801 | Siltamaki | Dec. 19, 1950 |
| 2,668,934 | Nierman | Feb. 9, 1954 |
| 2,686,895 | Feldhausen | Aug. 17, 1954 |
| 2,743,397 | Derr et al. | Apr. 24, 1956 |
| 2,773,231 | Adriansen et al. | Dec. 4, 1956 |
| 2,855,556 | Carp | Oct. 27, 1958 |
| 2,909,709 | Metz et al. | Oct. 20, 1959 |